UNITED STATES PATENT OFFICE.

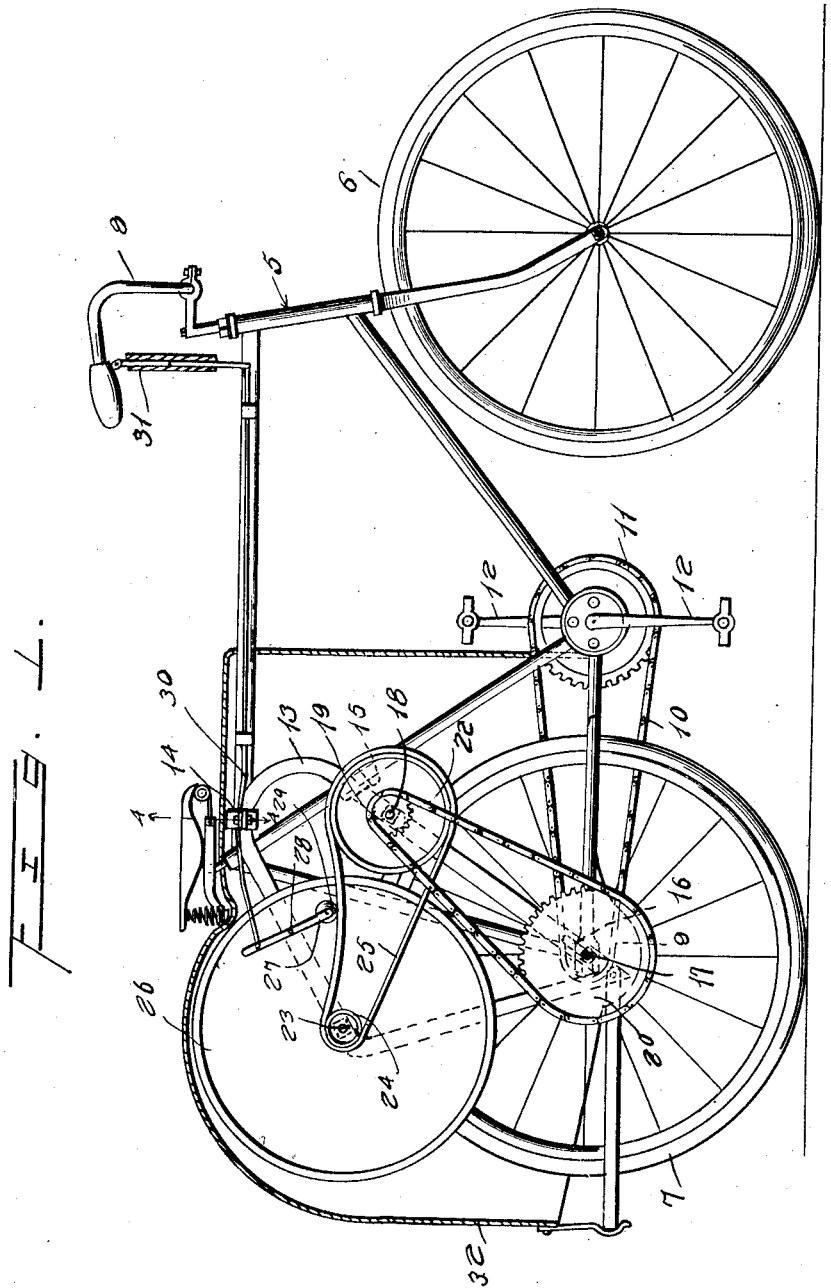

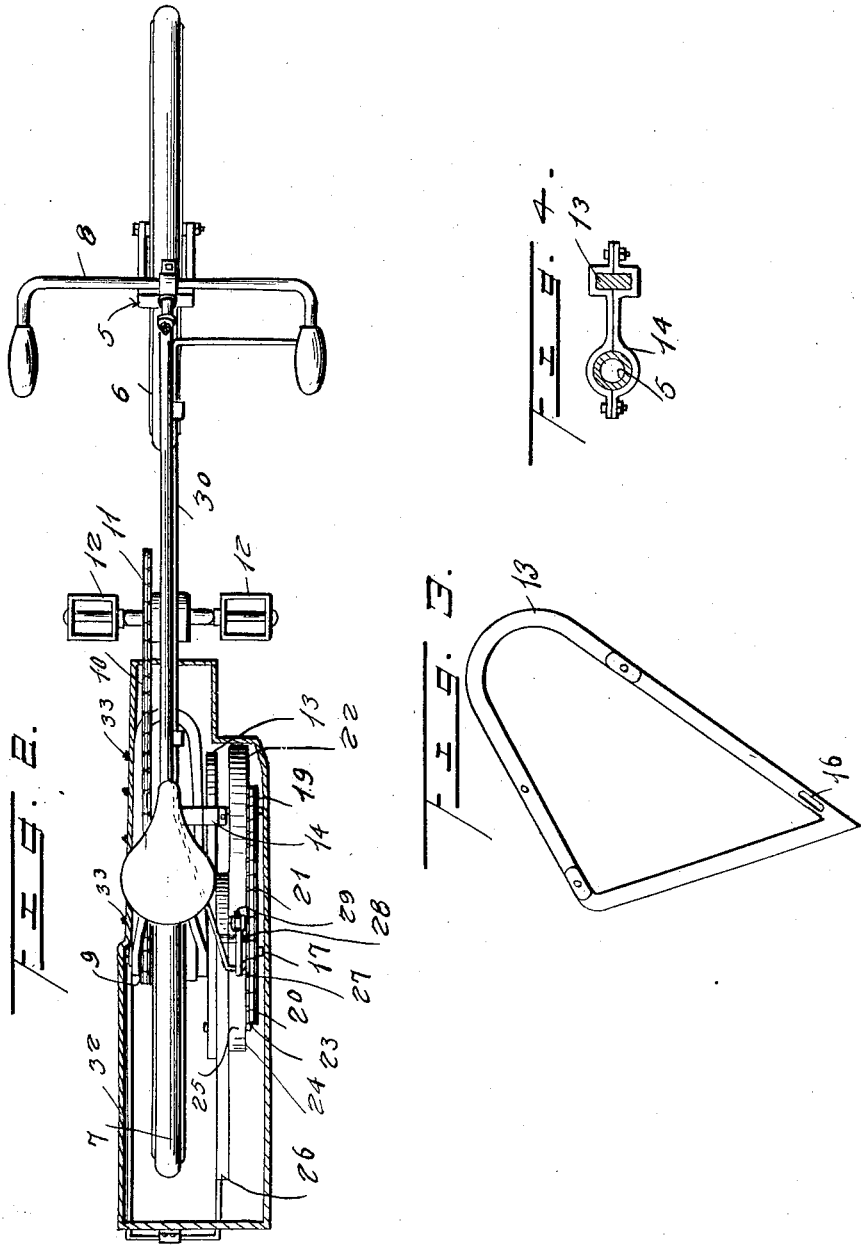

LESLIE MILLER WALLACE, OF HOLSTEIN, IOWA.

BICYCLE.

1,329,940.  Specification of Letters Patent.  Patented Feb. 3, 1920.

Application filed October 25, 1918. Serial No. 259,677.

*To all whom it may concern:*

Be it known that I, LESLIE MILLER WALLACE, a citizen of the United States, residing at Holstein, in the county of Ida and State of Iowa, have invented certain new and useful Improvements in Bicycles; and I do hereby declare the following to be a full, clear, and exact description of the invention, such as will enable others skilled in the art to which it appertains to make and use the same.

My invention relates to improvements in bicycles, and more particularly to propelling means therefor.

An important object of this invention is to provide a bicycle having a fly wheel connected with the propelling mechanism, whereby the velocity of the wheel in descending a hill will be imparted to the fly wheel, and which in turn will assist in propelling the wheel up a subsequent hill.

A further object of the invention is to provide a bicycle having a fly wheel connected to the propelling mechanism, whereby the rear wheel may be elevated prior to starting, and by operating the usual pedals, a considerable degree of velocity may be imparted to the fly wheel, which will assist in starting the wheel off.

Other objects and advantages of the invention will be apparent during the course of the following description.

In the accompanying drawings forming a part of this specification, and in which like numerals are employed to designate like parts throughout the same, Figure 1 is a side elevation of a wheel having my improved fly wheel attachment applied thereto, Fig. 2 is a plan view of the same, Fig. 3 is a side elevation of a frame or fly wheel support, and Fig. 4 is a section taken on line 4—4 of Fig. 1.

In the drawings, wherein for the purpose of illustration is shown the preferred embodiment of my invention, the numeral 5 generically designates a bicycle frame of the usual construction. Front and rear wheels 6 and 7, respectively, are provided. The front wheel 6 is adapted to be steered by handle bars 8. The rear wheel 7 is provided with a sprocket 9 engaged by a chain 10. The chain 10 engages a relatively large sprocket wheel 11, adapted to be rotated by the operation of pedals 12. It will be apparent that the operation of the propelling mechanism described serves as a means for operating the rear wheel 7.

Secured to the frame 5 is a fly wheel-supporting frame 13. As clearly shown in Fig. 1, the fly wheel-supporting frame 13 is approximately triangular in shape and is secured to the frame by brackets 14 and 15. The lower portion of the frame 13 is provided with a longitudinally extending elongated slot 16, adapted for the reception of the outer portion of the axle 17 of the rear wheel 7. The elongated slot 16 in the lower portion of the frame permits of the adjustment of the same. Rotatably carried by the upper portion of the frame 13 is a shaft 18, having keyed thereto a relatively small sprocket 19. A sprocket 20, keyed to the axle 17, is connected with the sprocket 19 through the medium of a chain 21. Keyed to the shaft 18 is a pulley wheel 22. The sprocket 19 is approximately one-third the diameter of the sprocket 20, and thus a revolution of the sprocket 20 will cause the pulley to revolve nine times. Rotatably carried by the rear portion of the frame 13 is a shaft 23. A pulley 24 is keyed to the shaft 23 and is rotated by the pulley 22 through the medium of a belt 25. The peripheries of the pulleys 22 and 24 are provided with annular grooves to prevent the sliding off of the belt. A fly wheel 26 is also keyed to the shaft 23 and is driven by the rotation of the pulley 24. As clearly shown in Fig. 1, the fly wheel 26 is considerably larger than the pulley 22 and the same will be caused to rotate considerably faster than the rear wheel 7.

To provide means for disconnecting the fly wheel 26, I have provided a belt tightener or releaser, designated generically by the numeral 27. The belt tightener is pivoted at 28, and is provided with a roller 29, contacting with the belt 25. The upper end portion of the member 27 is connected with an operating rod 30, extending forwardly of the frame 5 and having connection with an operating lever 31 arranged on the handle bar 8. It will be apparent that the operation of the member 31 will either tighten or loosen the tension of the belt.

A shield 32 is adapted to be secured to the frame 13 by nuts 33. The shield 32 is adapted to extend over the fly wheel 26 and associated elements.

A suitable stand may be provided for the rear wheel.

In the use of my invention, when it is desired to start the wheel, the rear wheel is elevated by the stand, and the operator causes the rear wheel 7 to revolve. The rotation of the rear wheel 7 will cause the fly wheel 26 to revolve about twenty-seven times as fast as the rear wheel 7. When the wheel 26 has gained sufficient momentum, the wheel may be released and the belt tightener 27 may also be released. Upon starting off, it is not necessary for the operator to operate the pedals 12, but he may by tightening the belt 27 cause the momentum of the wheel 26 to propel the wheel for some distance. The operator may now proceed and disengage the fly wheel if he so desires. Upon descending a hill the fly wheel 26 may be caused to rotate with the wheel 7, and thus gain considerable momentum. Upon proceeding up a subsequent hill, it will be apparent that the fly wheel 26 will assist to some extent in propelling the wheel up the hill.

While I have shown and described the preferred embodiment of my invention, it is understood that I may make such minor changes in arrangement and construction of parts as will remain within the spirit of the invention and the scope of the appended claim.

Having thus described my invention, what I claim is:

The combination with a bicycle having a driven rear wheel; a fly wheel supporting frame secured to the frame of the bicycle; a fly wheel rotatably carried by the fly wheel supporting frame; a sprocket arranged on the axle of the rear wheel; a relatively small sprocket secured to the frame; a sprocket chain connecting the relatively small sprocket wheel and the first-named sprocket wheel; a pulley rotatably carried by the frame and adapted to be rotated by the rotation of said relatively small sprocket wheel; a relatively small pulley carried by the frame; a belt connecting the said pulleys, and a clutch mechanism adapted to operate on said pulley.

In testimony whereof I affix my signature in presence of two witnesses.

LESLIE MILLER WALLACE.

Witnesses:
CLARENCE BUSH,
OTIS L. RUSSELL.